(12) United States Patent
Goss et al.

(10) Patent No.: US 9,937,702 B1
(45) Date of Patent: Apr. 10, 2018

(54) METHOD AND APPARATUS FOR CALIBRATING A THREE DIMENSIONAL (3D) PRINTER

(71) Applicant: Marvell International Ltd., Hamilton (BM)

(72) Inventors: Steven M. Goss, Corvallis, OR (US); Gregory F. Carlson, Corvallis, OR (US); James Mealy, Oviedo, FL (US); Phillip Salvatori, Salem, OR (US)

(73) Assignee: Marvell International Ltd., Hamilton (BM)

( * ) Notice: Subject to any disclaimer, the term of this patent is extended or adjusted under 35 U.S.C. 154(b) by 598 days.

(21) Appl. No.: 14/598,047

(22) Filed: Jan. 15, 2015

Related U.S. Application Data

(60) Provisional application No. 61/929,421, filed on Jan. 20, 2014.

(51) Int. Cl.
*B33Y 50/00* (2015.01)
*B33Y 50/02* (2015.01)
*G06F 17/50* (2006.01)

(52) U.S. Cl.
CPC ............. *B33Y 50/02* (2014.12); *G06F 17/50* (2013.01)

(58) Field of Classification Search
None
See application file for complete search history.

(56) References Cited

U.S. PATENT DOCUMENTS

| | | | |
|---|---|---|---|
| 7,828,295 B2* | 11/2010 | Matsumoto | A63F 13/06 273/238 |
| 9,076,082 B1* | 7/2015 | Cudak | G06K 15/00 |
| 2015/0087427 A1* | 3/2015 | Wane | A63F 13/213 463/43 |

OTHER PUBLICATIONS

InfraStructs: Fabricating Information Inside Physical Objects for Imaging in the Terahertz Region; by Willia et al.; Published Jul. 2013; 10 pages.*

* cited by examiner

*Primary Examiner* — Ronald Hartman, Jr.

(57) ABSTRACT

Embodiments include an apparatus for fabricating a three-dimensional object from a digital representation of the object stored in a computer readable media, the apparatus comprising: a component having a surface on which the object is to be fabricated, wherein information is embedded within the component; a sensor configured to sense the information embedded within the component; a module configured to, based on the sensor sensing the information embedded within the component, determine one or both of (i) a characteristic of the component and (ii) a configuration parameter of the apparatus; and a print mechanism disposed above the surface of the component, wherein the print mechanism is configured to, based on the determined one or both of (i) the characteristic of the component and (ii) the configuration parameter of the apparatus, fabricate the object on the surface of the component.

17 Claims, 6 Drawing Sheets

US 9,937,702 B1

METHOD AND APPARATUS FOR CALIBRATING A THREE DIMENSIONAL (3D) PRINTER

CROSS REFERENCE TO RELATED APPLICATIONS

This claims priority to U.S. Provisional Patent Application No. 61/929,421, filed on Jan. 20, 2014, which is incorporated herein by reference in its entirety.

TECHNICAL FIELD

Embodiments of the present disclosure relate to three-dimensional (3D) printing, and in particular to calibrating a 3D printer.

BACKGROUND

Additive manufacturing technology enables computer designs, such as CAD files, to be fabricated into three dimensional (3D) objects. Additive manufacturing, also known as 3D printing, typically comprises depositing, curing, fusing, or otherwise forming a material into sequential cross-sectional layers of the 3D object. The fabrication of a 3D object is achieved using additive processes. Thus, an object is created by laying down successive layers of material until the entire object is created. Each of these layers can be seen as a thinly sliced horizontal cross-section of the eventual object.

In 3D printing, an object is typically printed or fabricated over a stationary printing table, for example, on a table insert of the table. If a specific table insert is usually used in a specific 3D printer, the 3D printer is calibrated based on the characteristics of the table insert, to form objects over the table insert. However, if a different table insert is to be used in the 3D printer, the calibration process may have to be repeated, which is time consuming.

SUMMARY

In various embodiments, the present disclosure provides an apparatus for fabricating a three-dimensional object from a digital representation of the object stored in a computer readable media, the apparatus comprising: a component having a surface on which the object is to be fabricated, wherein information is embedded within the component; a sensor configured to sense the information embedded within the component; a module configured to, based on the sensor sensing the information embedded within the component, determine one or both of (i) a characteristic of the component and (ii) a configuration parameter of the apparatus; and a print mechanism disposed above the surface of the component, wherein the print mechanism is configured to, based on the determined one or both of (i) the characteristic of the component and (ii) the configuration parameter of the apparatus, fabricate the object on the surface of the component.

In various embodiments, the present disclosure also provides a method for fabricating a three-dimensional object from a digital representation of the object stored in a computer readable media, the method comprising: sensing information embedded within a component, wherein the component has a surface; based on sensing the information embedded within the component, determining one or both of (i) a characteristic of the component and (ii) a configuration parameter associated with fabricating the object; and based on determining one or both of (i) the characteristic of the component and (ii) the configuration parameter associated with fabricating the object, fabricating the object on the surface of the component.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Figure 1A:
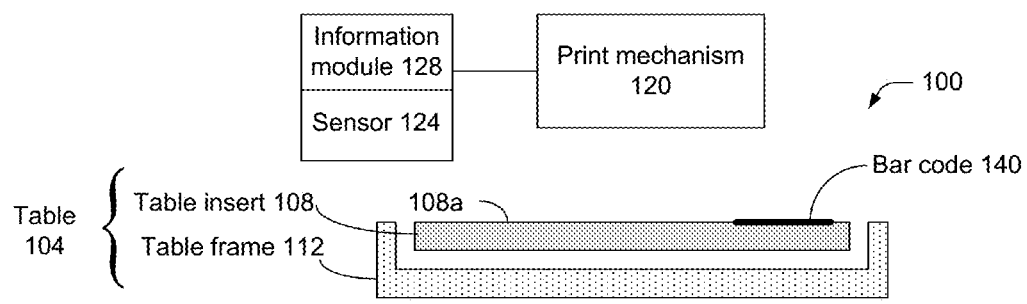
FIGS. 1A-1B schematically illustrate a system for fabricating a 3D object from a digital representation of the object.
Figure 1B:
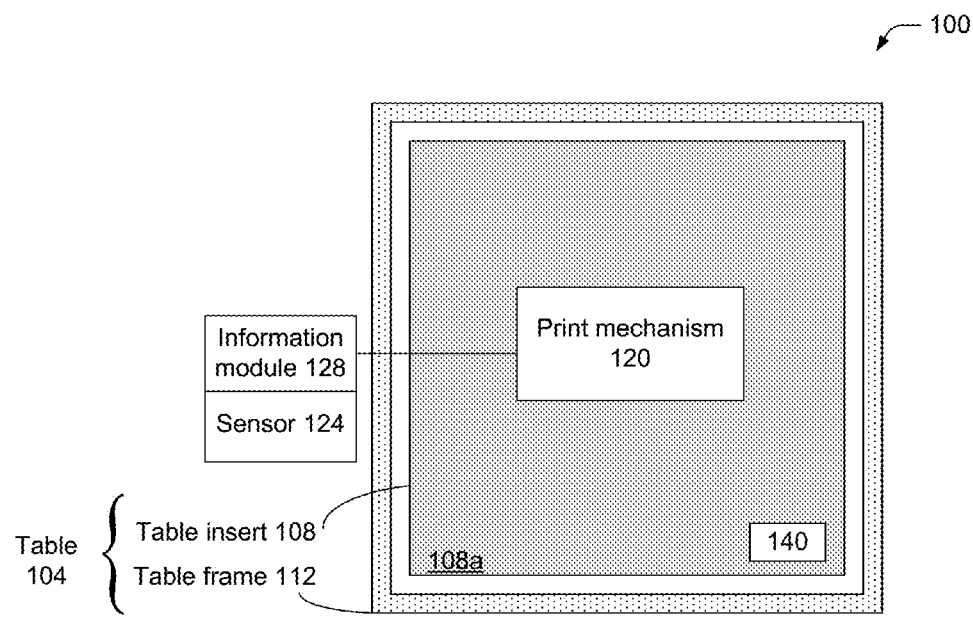

FIGS. 1A and 1B schematically illustrate a system 100 for fabricating a 3D object from a digital representation of the object. In an example, the system 100 comprises a 3D printing system (e.g., a 3D printer). The system 100 comprises a table 104 and a print mechanism 120 disposed above the table 104. FIG. 1A illustrates a side view of the table 104 and the print mechanism 120, while FIG. 1B illustrates a top view of the table 104 and the print mechanism 120.

The print mechanism 120 receives a digital representation of a 3D object to be printed (e.g., from a computer readable storage media, e.g., a memory, not illustrated in FIGS. 1A and 1B). The print mechanism 120 is configured to fabricate the object on the table 104, e.g., by selectively depositing layers of printing material on the table 104. Although not illustrated in FIGS. 1A and 1B, the print mechanism 120 comprises one or more print nozzles, driving mechanism for driving the print nozzles, and/or one or more components that are present in a print mechanism of a 3D printer.

In an embodiment, the table 104 comprises a table insert 108 and a table frame 112. The object is fabricated by the print mechanism 120 on a surface 108a of the table insert 108. In an embodiment, the table insert 108a is removably attached to the table frame 112. For example, while the object is being fabricated by the print mechanism 120 on the surface 108a of the table insert 108, the table insert 108 is attached or placed on the table frame 112. In an embodiment, while the object is being fabricated, the table 104 remains stationary, and the print mechanism 120 moves over the surface 108a to deposit the printing material over the surface 108a, thereby forming the object over the surface 108a.

Once the object is fabricated on the surface 108a of the table insert 108, the table insert 108 can be removed from the table frame 112. For example, the table insert 108 is removed from the table frame 112 to remove the fabricated object from the table insert 108, clean and prepare the table insert 108 for a next printing job, replace the table insert 108 with a different table insert (not illustrated in FIGS. 1A and 1B), and/or for any other appropriate reasons.

In an embodiment, the table insert 108 has a bar code 140 marked on the surface 108a. The bar code 140 can be, for example, a one dimensional or a two dimensional bar code. In an example, the bar code 140 embeds information associated with the table insert 108, as will be discussed in detail herein later.

In an embodiment, the system 100 further comprises a sensor 124 and an information module 128 (henceforth referred to as "module 128"). The sensor 124 is configured to scan or read the bar code 140. The sensor 124 can be any appropriate sensor that can scan or read the bar code 140. In an example, the sensor 124 comprises an optical scanner, a bar code reader, a camera, and/or the like. In an embodiment, the scanner 124 can be positioned at any appropriate position, from which the scanner 124 can scan or read the bar code 140. In an example, the scanner 124 can be attached to, or be a part of the print mechanism 120. The module 128 can be placed in any appropriate position. For example, the module 128 can be attached to, or be a part of the print mechanism 120, or placed on another appropriate component of the system 100. In an example, the module 128 is integrated with the sensor 124.

In an embodiment, the module 128 is configured to receive information scanned or read by the sensor 124 from the bar code 140, and further configured to determine one or more characteristics of the table insert 108 and/or one or more recommended configuration parameters associated with the system 100. In an example, the module 128 is coupled to a network, e.g., the Internet.

In an embodiment, the bar code 140 embeds information that represents one or more characteristics of the table insert 108 and/or one or more recommended configuration parameters associated with the system 100.

In another embodiment, the bar code 140 embeds information, based on which the module 128 determines one or more characteristics of the table insert 108 and/or one or more recommended configuration parameters associated with the system 100. For example, the bar code 140 embeds a serial number, a make, a model, a manufacturer information, and/or the like of the table insert 108, and the module 128 uses such information embedded in the bar code to access a server over a network (e.g., such as the Internet) to determine one or more characteristics of the table insert 108 and/or one or more recommended configuration parameters associated with the system 100. For example, the module 128 accesses a website, and uses the information embedded in the bar code to look up one or more characteristics of the table insert 108 and/or one or more recommended configuration parameters associated with the system 100.

In yet another embodiment, the bar code 140 embeds first information that represents a characteristic of the table insert 108, and embeds second information (e.g., a serial number, a make, a model, a manufacturer information, and/or the like of the table insert 108)—the module 128 accesses a website of the manufacturer of the table insert 108 and uses the second information to determine, from the website, a second characteristics of the table insert 108.

In an embodiment, the print mechanism 120 receives, from the module 128, one or more characteristics of the table insert 108 and/or one or more recommended configuration parameters associated with the system 100. The print mechanism 120 fabricates one or more three-dimensional objects on the surface 108a of the table insert, based at least in part on information received from the module 128.

In an example, a manufacturer or a supplier of the table insert 108 embeds the information in the form of the bar code 140 in the table insert 108, e.g., while testing and/or calibrating the table insert 108.

The characteristics determined by the module 128, based on the bar code 140, comprise any appropriate characteristics of the table insert 108. For example, the characteristics of the table insert 108, as determined by the module 128, comprises a thickness of the table insert 108. In an example, various types of table inserts, which can be used in the system 100, can have different thicknesses. In another example, the thickness of a table insert can vary (e.g., the table insert can be tapered at one or more edges). Such variations in thicknesses of the table inserts may be by design, due to process or manufacturing variability, and/or the like. Based on the module 128 determining information associated with the thickness of the table insert 108, the print mechanism 120 can calibrate itself to achieve accurate fabrication of the object. For example, based on the determined thickness of the table insert 108, the print mechanism 120 can more accurately position itself over the surface 108a while fabricating the 3D object over the surface 108a.

A 3D object is formed in the system 100 by laying down successive layers or slices of printing material, until the entire 3D object is created. Each of these layers can be seen as a thinly sliced horizontal cross-section of the eventual object. In an embodiment, the formation of the layers of the 3D object is at least in part based on the characteristics of the table insert 108, as determined by the module 128. As an example, assume that the surface 108a of the table insert 108 is uneven, and such information about the surface 108a is embedded in the bar code 140 (or otherwise determined by the module 128, based on information embedded in the bar code 140). In an example, the layers of the 3D object are formed at least in part based on such surface information of the table insert 108. For example, for an area of the table insert 108 that is at a lower level than other areas of the table insert 108, an additional layer is formed over the lower leveled area (e.g., to compensate for the lower level), to level up the various layers of the 3D object and to ensure that the 3D object is firmly formed on the table insert 108. Similarly, as an example, for an area of the table insert 108 that is at a higher level than other areas of the table insert 108, a layer of the 3D object may be skipped from forming over the higher leveled area (e.g., to compensate for the higher level), to level up the various layers of the 3D object and to ensure that the 3D object is firmly formed on the table insert 108. Any other appropriate type of adjustment of formation of the layers of the 3D object can also be performed, based on information about the surface 108a of the table insert 108.

In an example, prior to fabricating (e.g., by the print mechanism 120) the 3D object over the table insert 108, some type of glue is applied (e.g., by the print mechanism 120 and/or manually) on the surface 108a, to temporarily glue the fabricated 3D object to the surface 108a. Once the object is fabricated, the object is removed from the surface 108a, e.g., by dissolving the glue, by applying force to take the fabricated object apart from the surface 108a, and/or the like. In an embodiment, the characteristics of the table insert 108, as determined by the module 128, comprises information about the surface 108a of the table insert 108 (e.g., surface characteristics of the table insert 108), and such information can be helpful in selecting and/or applying the glue over the surface 108a. Such surface characteristics of the table insert 108 comprise, for example, information associated with surface finish, surface evenness, and/or the like.

In an example, instead of (or in addition to) applying glue to hold the object to the surface 108a (e.g., while the object is being fabricated), the surface 108a is heated at the beginning of the fabrication of the object, and then gradually cooled. Such heating and cooling at least partially melts and then hardens a first few layers of the printing material (which is used to fabricate the object), and holds the object to the surface 108a while the object is being fabricated. In an embodiment, the characteristics of the table insert 108, as determined by the module 128, comprises information about the surface 108a of the table insert 108 (e.g., surface characteristics of the table insert 108, such as information associated with surface finish, surface evenness, and/or the like), thermal properties of the table insert 108, etc., and such information can be helpful in applying heat to the table insert 108 and/or cooling the table insert 108.

Although a few example characteristics of the table insert 108, which can be determined by the module 128, are discussed above, the module 128 can determine any other appropriate characteristics of the table insert 108 (e.g., based on the sensor 124 sensing information embedded in the table insert 108), as will be understood by those skilled in the art based on the teaching provided herein.

In an embodiment, in addition to (or instead of) determining one or more characteristics of the table insert 108, the module 128 determines (e.g., based on the sensor 124 scanning the barcode 140) one or more recommended configuration parameters associated with the system 100. For example, based on various characteristics of the table insert 108, a manufacturer of the table insert 108 embeds various recommended or suggested configuration parameters of a 3D printer in which the table insert 108 is to be used. For example, the recommended or suggested configuration parameters comprises a type or amount of glue to be applied on the surface 108a (e.g., prior to or while fabricating the object on the surface 108a), various recommended heating and/or cooling parameters associated with heating and/or cooling the table insert 108a, a recommended pressure with which printing material is to be deposited by the print mechanism 120 on the surface 108a, a recommended speed with which the print mechanism 120 is to operate, a setting of an extruder used for fabricating the object, and/or the like.

Although a few example recommended configuration parameters, which can be determined by the module 128, are discussed above, the module 128 can determine any other appropriate recommended configuration parameters (e.g., based on the sensor 124 sensing information embedded in the table insert 108), as will be understood by those skilled in the art based on the teaching provided herein.

Figure 1C:
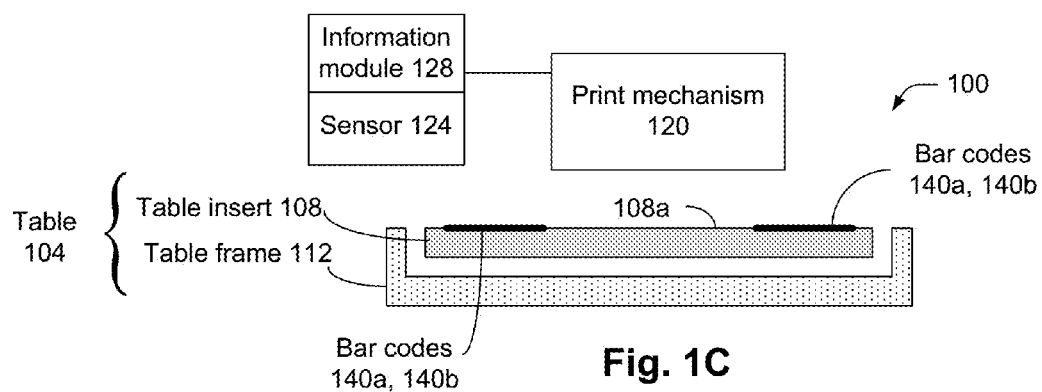
FIGS. 1C-1D schematically illustrate another system for fabricating a 3D object from a digital representation of the object.
Figure 1D:
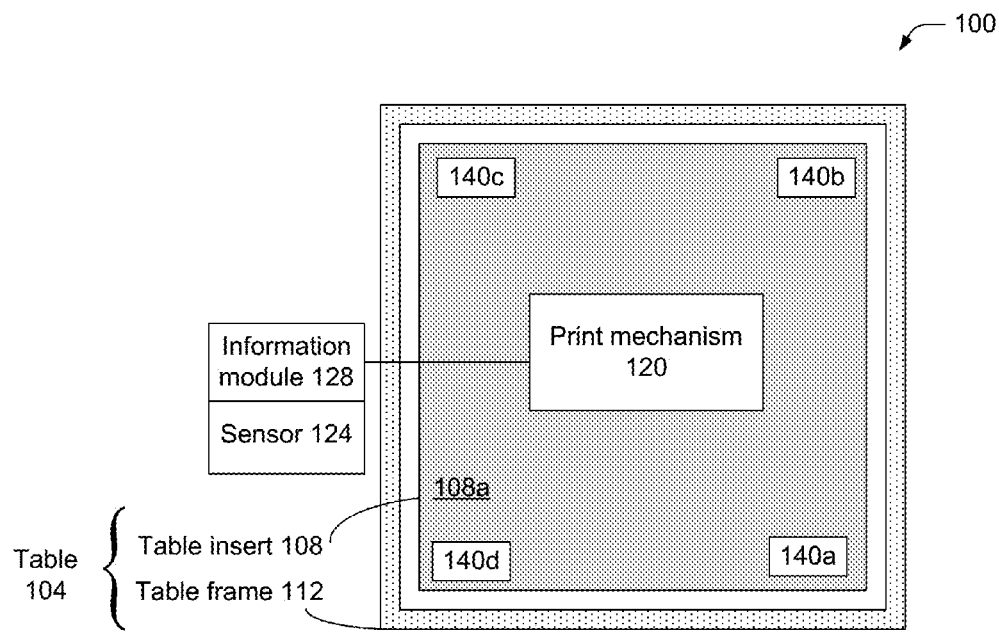

In FIGS. 1A and 1B, a single bar code 140 is affixed on the surface 108a of the table insert 108. In another embodiment, however, more than one bar code may be affixed on the surface 108a. For example, FIGS. 1C and 1D illustrate bar codes 140a, . . . , 140d affixed on the surface 108a. That is, the bar codes 140a, . . . , 140d in FIGS. 1C and 1D replace the single bar code 140 in FIGS. 1A and 1B. With the exception of the bar codes, the systems of FIGS. 1C and 1D are similar to the systems of FIGS. 1A and 1B, respectively.

In an embodiment, each of the bar codes 140a, . . . , 140d include similar information, and the sensor 124 scans at least one of the bar codes 140a, . . . , 140d (e.g., based on a position of the sensor 124 relative to these bar codes) to sense information embedded in the bar codes 140a, . . . , 140d. In another embodiment, each of the bar codes 140a, . . . , 140d include different information, and the sensor 124 scans two or more of the bar codes 140a, . . . , 140d to sense the embedded information.

FIGS. 1C and 1D illustrate four bar codes 140a, . . . , 140d affixed on four corners of the surface 108a of the table insert 108. However, in another example, the table insert 108 can include any other appropriate number of bar codes that are affixed at any other appropriate locations on the surface 108a.

FIGS. 1A-1D illustrate embedded information associated with the table insert 108, via bar codes affixed on the surface 108a of the table insert 108. However, information can be embedded within a table insert by any other appropriate means, e.g., using a near field communication (NFC) tag, a radio frequency identifier (RFID) tag, a memory (e.g., a non-volatile memory), and/or the like.

Figure 2A:
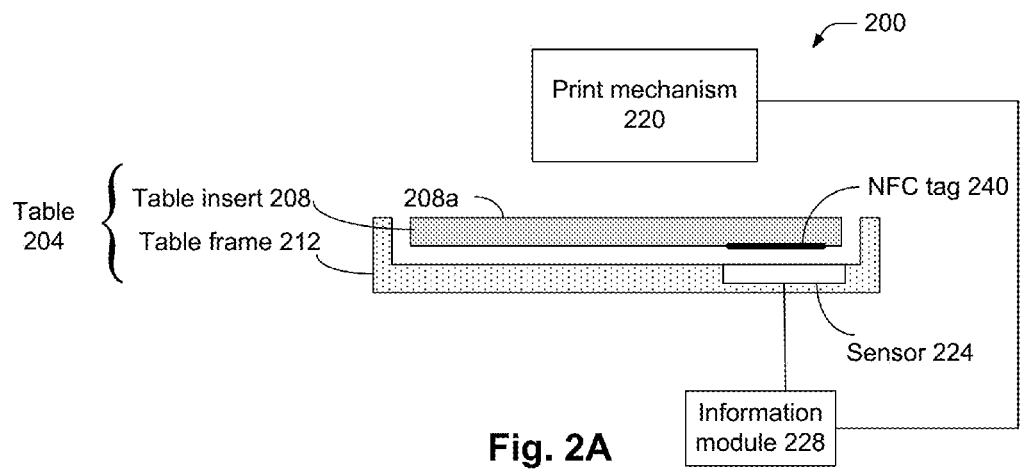
FIGS. 2A-2B schematically illustrate another system for fabricating a 3D object from a digital representation of the object.
Figure 2B:
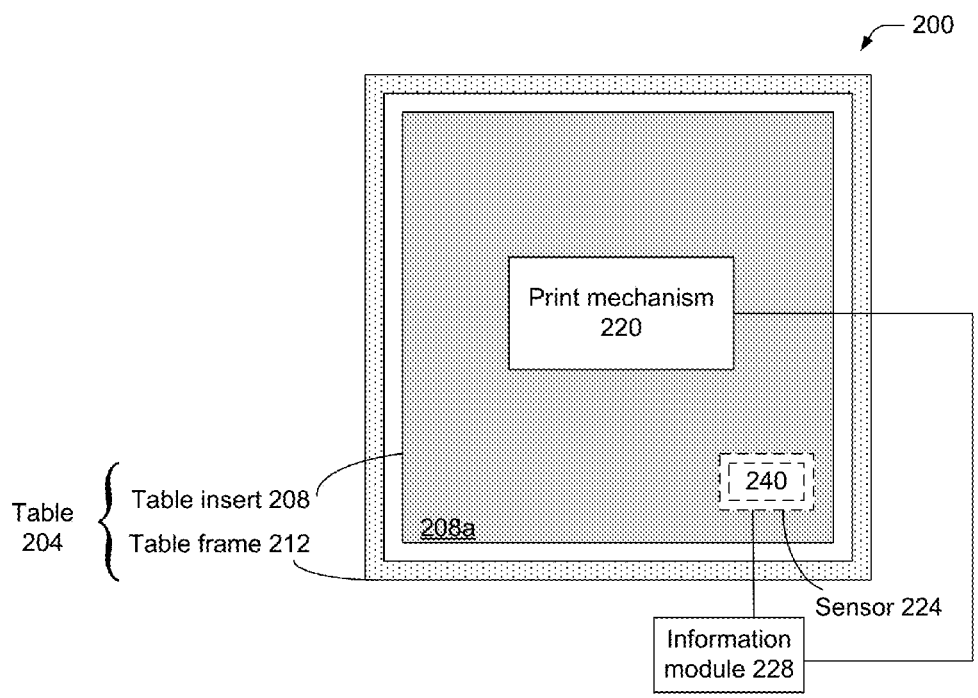

FIGS. 2A and 2B schematically illustrate a system 200 for fabricating a 3D object from a digital representation of the object, and in the example of FIGS. 2A and 2B, information associated with a table insert 208 of the system 200 is embedded via a NFC tag. FIGS. 2A and 2B schematically illustrate a top view and a side view of the system 200, respectively. The system 200 illustrated in FIGS. 2A and 2B is at least in part similar to the system 100 illustrated in FIGS. 1A and 1B, respectively. For example, similar to the system 100, the system 200 comprises (i) a table 204 comprising a table insert 208 and a table frame 212, and (ii) a print mechanism 220. The print mechanism 220 fabricates a 3D object on a surface 208a of the table insert 208.

In an embodiment, a NFC tag 240 is embedded within or attached to the table insert 208. For example, the NFC tag 240 is attached to a surface of the table insert 208, which is opposite to the surface 208a of the table insert 208. The system 200 further comprises a sensor 224, which, for example, is a NFC tag reader. Thus, the NFC tag 240 and the sensor 224 of the system 200 of FIGS. 2A and 2B replaces the bar code 140 and the sensor 124 of the system 100 of FIGS. 1A and 1B.

Similar to the system 100 of FIGS. 1A and 1B, in an embodiment, the system 200 of FIGS. 2A and 2B further comprises an information module 228 (also referred to herein as "module 228") coupled to the sensor 224.

In an embodiment, the NFC tag 240 stores information associated with the table insert 208 in accordance with NFC standards (e.g., as standardized in ECMA-340 and ISO/IEC 18092, or any previous or subsequent NFC standards). The sensor 224 (which is a NFC tag reader) reads information stored in the NFC tag 240. The module 228 determines, based on the sensor 224 reading information stored in the NFC tag 240, one or more characteristics of the table insert 208 and/or one or more recommended or suggested configuration parameters associated with the system 200, as discussed previously herein with respect to the system 100 of FIGS. 1A and 1B.

In FIGS. 2A and 2B, the sensor 224 is located proximally to the NFC tag 240. In an example, the sensor 224 is located on the table frame 212, such that the NFC tag 240 is located proximally to the sensor 224 when the table insert 208 is placed on the table frame 212.

In FIGS. 2A and 2B, for example, the NFC tag 240 is located on a first corner of the table insert 208, and the sensor 224 is located on a first corner of the table frame 212. The table insert 208 is placed within the table frame 212 such that the first corner of the table insert 208 is over the first corner of the table frame 212.

However, in an example, the table insert 208 can have a square shape, and thus, there are four possible configurations in which the table insert 208 can be placed within the table frame 212. That is, the first corner of the table insert 208 may not necessarily be placed over the first corner of the table frame 212. To overcome such situations, in an example and although not illustrated in FIGS. 2A and 2B, four NFC tags (e.g., each being similar to the NFC tag 240) are embedded in four corners (or near four edges) of the table insert 208, such that at least one of the four NFC tags is over the sensor 224 when the table insert 208 is placed within the table frame 212. In another example and although not illustrated in FIGS. 2A and 2B, only a single NFC tag (i.e., the NFC tag 240) is embedded within the table insert 208, and four sensors (e.g., each being similar to the sensor 224) are embedded in four corners (or near four edges) of the table frame 212, such that the NFC tag 240 is over one of the four sensors when the table insert 208 is placed within the table frame 212. In yet another example and although not illustrated in FIGS. 2A and 2B, both the NFC tag 240 and the sensor 224 are placed substantially in respective centers of the table insert 208 and the table frame 212, such that the NFC tag 240 is placed proximal to the sensor 224, irrespective of the manner or configuration in which the table 208 is placed within the table frame 212. In an embodiment, a number and/or a position of the NFC tag and/or the sensor can be determined in any other appropriate manner, to ensure that at least one NFC tag is placed proximal to at least one sensor, irrespective of the manner or configuration in which the table 208 is placed within the table frame 212.

In FIGS. 2A and 2B, the module 228 may be placed in any appropriate position. For example, the module 228 can be placed within the table frame 212, the print mechanism 220, or another appropriate component of the system 200. In an example, the module 228 is integrated with the sensor 224.

Figure 3A:
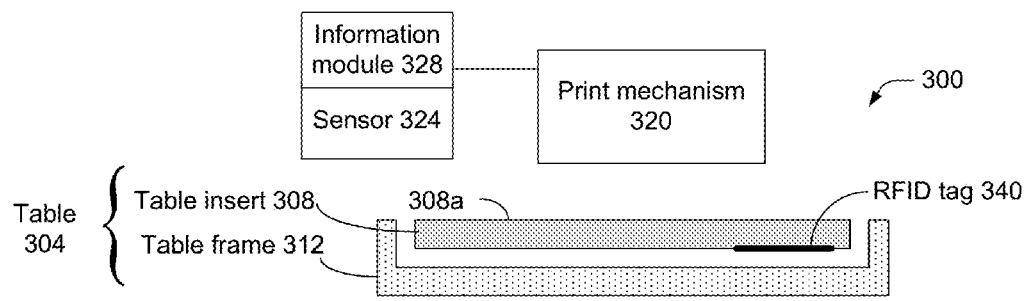
FIGS. 3A-3B schematically illustrate another system for fabricating a 3D object from a digital representation of the object.
Figure 3B:
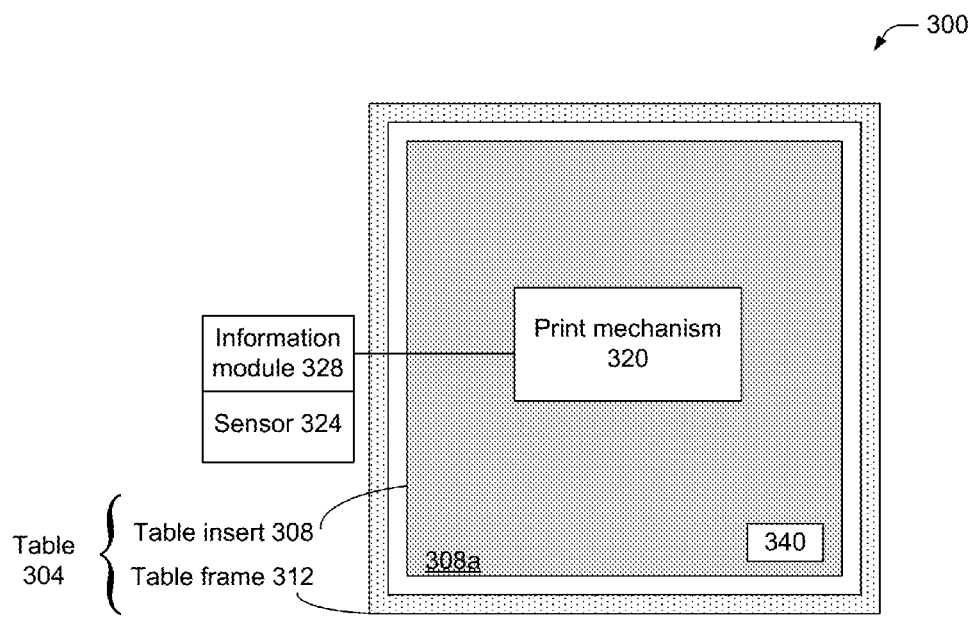

FIGS. 3A and 3B schematically illustrate a system 300 for fabricating a 3D object from a digital representation of the object, and in the example of FIGS. 3A and 3B, information associated with a table insert 308 of the system 300 is embedded via a RFID tag 340. FIGS. 3A and 3B respectively illustrate a top view and a side view of the system 300. The system 300 illustrated in FIGS. 3A and 3B is at least in part similar to the system 100 illustrated in FIGS. 1A and 1B, respectively. For example, similar to the system 100, the system 300 comprises (i) a table 304 comprising a table insert 308 and a table frame 312, and (ii) a print mechanism 320. The print mechanism 320 fabricates a 3D object on a surface 308a of the table insert 308.

In an embodiment, a RFID tag 340 is embedded within or attached to the table insert 308. The system 300 further comprises a sensor 324, which, for example, is a RFID tag reader. Similar to the system 100 of FIGS. 1A and 1B, in an embodiment, the system 300 of FIGS. 3A and 3B further comprises an information module 328 (also referred to herein as "module 328").

In an embodiment, the RFID tag 340 stores information associated with the table insert 308. The sensor 324 is a RFID tag reader, which reads information stored in the RFID tag 340. The module 328 determines, based on the sensor 324 reading information stored in the RFID tag 340, one or more characteristics of the table insert 308 and/or one or more recommended or suggested configuration parameters associated with the system 300, as discussed previously herein with respect to the system 100 of FIGS. 1A and 1B.

In an embodiment, the RFID tag 340 is embedded within the table insert 308. In another embodiment, the RFID tag 340 is attached to a surface of the table insert 308, which is opposite of the surface 308a of the table insert 308. The RFID tag 340 may be placed at any location of the table insert 308, e.g., near a corner of the table insert 308 (e.g., as illustrated in FIGS. 3A and 3B), near an edge of the table insert 308, near a center of the table insert 308, or the like.

In an embodiment, the sensor 324 can be located at any appropriate location within the system 300, such that the RFID tag 340 is within a detection range of the sensor 324 when the table insert 308 is placed within the table frame 312. For example, the sensor 324 can be located on the table frame 312, on the print mechanism 320, or the like.

Figure 4A:
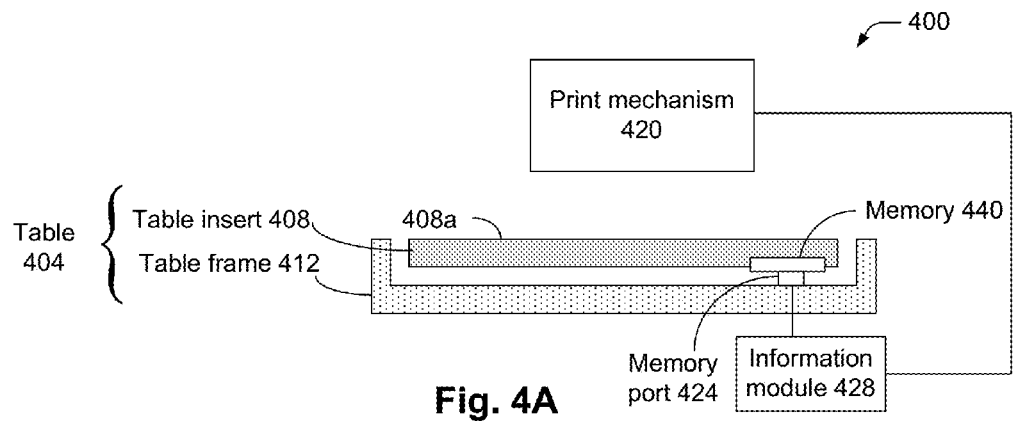
FIGS. 4A-4B schematically illustrate another system for fabricating a 3D object from a digital representation of the object.
Figure 4B:
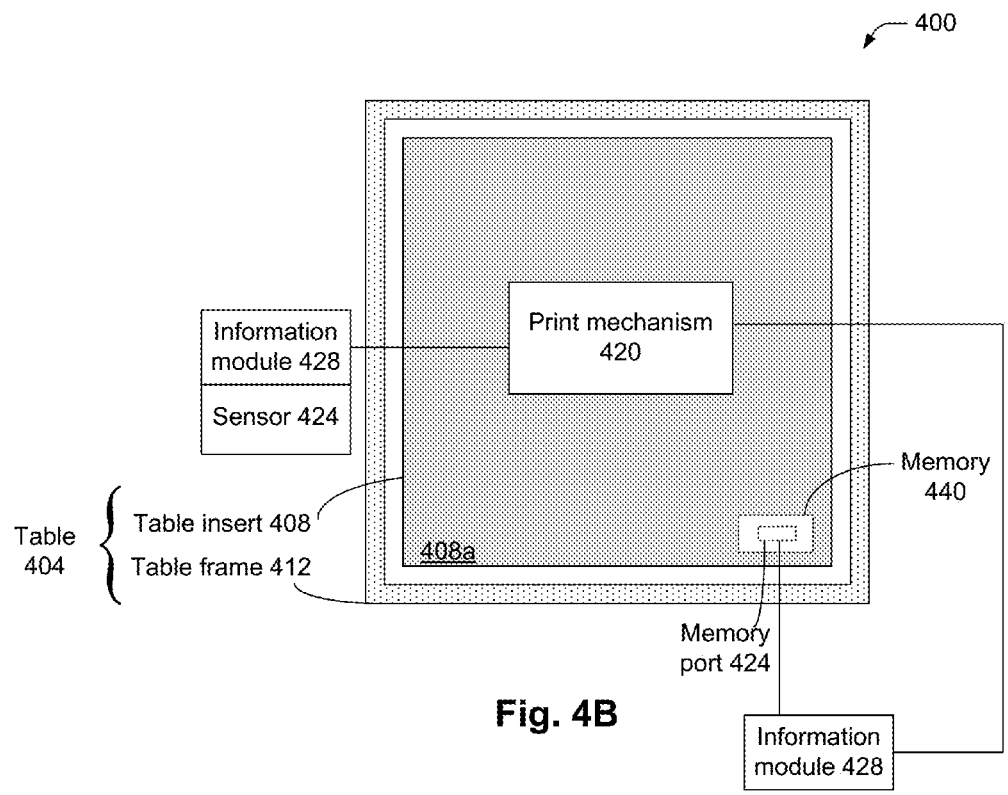

FIGS. 4A and 4B schematically illustrate a system 400 for fabricating a 3D object from a digital representation of the object, and in the example of FIGS. 4A and 4B, information associated with a table insert 408 of the system 400 is embedded via a memory 440. FIGS. 4A and 4B respectively illustrate a top view and a side view of the system 400. The system 400 illustrated in FIGS. 4A and 4B is at least in part similar to the system 100 illustrated in FIGS. 1A and 1B, respectively. For example, similar to the system 100, the system 400 comprises a table 404 comprising a table insert 408 and a table frame 412, and a print mechanism 420. The print mechanism 420 fabricates a 3D object on a surface 408a of the table insert 408.

In an embodiment, a memory 440 is embedded within or attached to the table insert 408. In an example, the memory 440 is a non-volatile memory, e.g., a non-volatile random access memory (NVRAM), a flash memory, or the like. In an embodiment, the system 400 further comprises a memory port 424, which, for example, is attached to the table frame 212. Similar to the system 100 of FIGS. 1A and 1B, in an embodiment, the system 400 of FIGS. 4A and 4B further comprises an information module 428 (also referred to herein as "module 428").

In an embodiment, the memory 440 stores information associated with the table insert 408. When the table insert 408 is placed within the table frame 412, the memory 440 is coupled to the memory port 424 of the table insert 412. The module 428 reads data from the memory 440 (e.g., via the memory port 424), and determines one or more characteristics of the table insert 408 and/or one or more recommended or suggested configuration parameters associated with the system 400, as discussed previously herein with respect to the system 100 of FIGS. 1A and 1B.

In an embodiment, although not illustrated in any of the figures, instead of, or in addition, to the bar code, the NFC tag, the RFID tag and/or the memory, a table insert can also have an appropriate identification information (e.g., a serial number) written on it. A human operator can read the identification information, and enter the identification information manually via an input interface (e.g., via a graphical user interface) of the system comprising the 3D printer. An information module (e.g., similar to the module 128 of FIG. 1) can access a server over a network (e.g., a website of a manufacturer of the table insert, via the Internet), and use the identification information to determine one or more characteristics and/or configuration parameters associated with the table insert. The print mechanism can then fabricate a 3D object on the table insert, based on the determined one or more characteristics and/or configuration parameters.

Embedding information on a table insert, as discussed with respect to FIGS. 1A-4B, ensures that no calibration is required each time a table insert is used in a system for printing 3D objects. This, for example, ensures that the system can be used with possibly different types of table inserts, without wasting time on calibrating the system each time a new type of table insert is used. This, in an example, substantially speeds up the operation of such a system.

Figure 5:
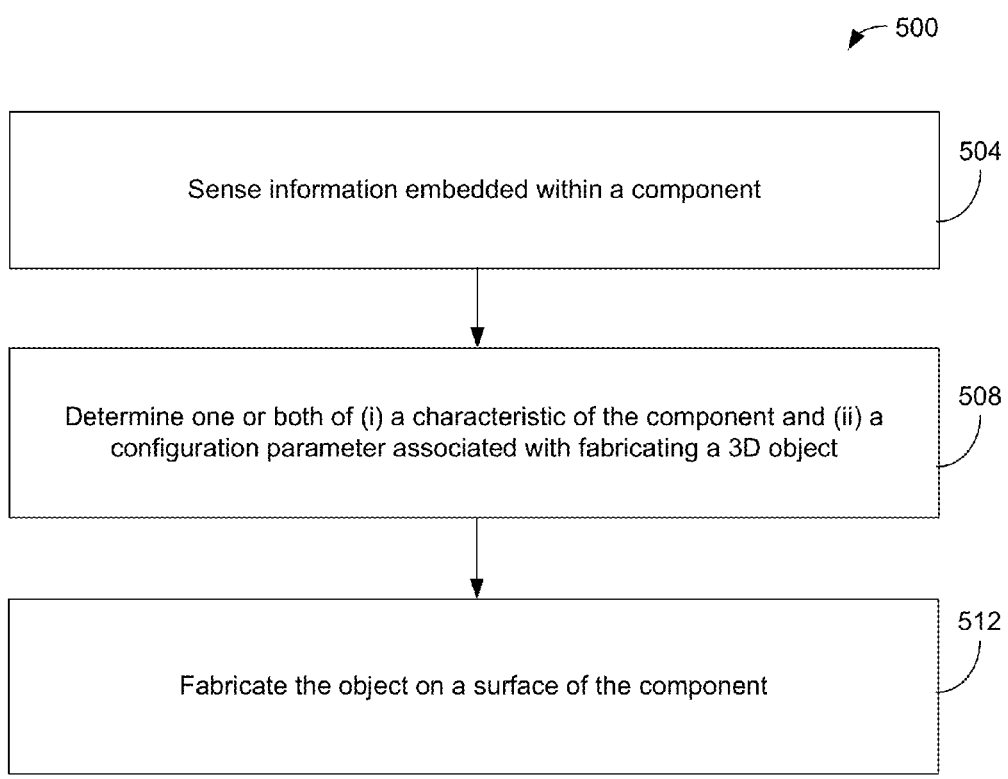
FIG. 5 is a flow diagram of an example method for fabricating a three dimensional object from a digital representation of the object stored in a computer readable media.

FIG. 5 is a flow diagram of an example method 500 for fabricating a three dimensional object from a digital representation of the object stored in a computer readable media. At 504, information embedded within a component (e.g., one of the table inserts 108, . . . , 408) is sensed (e.g., by one of the sensors 124, . . . , 324, or via the memory port 424).

At 508, based on sensing the information embedded within the component, one or both of (i) a characteristic of the component and (ii) a configuration parameter associated with fabricating the object is determined. In an example, the characteristic of the component comprises information associated with one of a thickness of the component, a surface finish of the component, a surface evenness of the component, a thermal property of the component, and/or the like. In an example, the configuration parameter associated with fabricating the object comprises one of a speed with which a print mechanism (e.g., one of the print mechanisms 120, . . . , 420) fabricates the object, a type and specification of glue to be disposed on a surface of the component while the object is being fabricated, a heating pattern for heating the component while the object is being fabricated, a cooling pattern for cooling the component while the object is being fabricated, a pressure with which printing material is to be deposited by the print mechanism while the object is being fabricated, and a setting of an extruder used for fabricating the object.

At 512, based on determining one or both of (i) the characteristic of the component and (ii) the configuration parameter associated with fabricating the object, the object is fabricated (e.g., by one of the print mechanisms 120, . . . , 420) on a surface (e.g., one of the surfaces 108a, . . . , 408a) of the component.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus for fabricating a three-dimensional object from a digital representation of the object stored in a computer readable media, the apparatus comprising:
   a component having a surface on which the object is to be fabricated, wherein information is embedded within the component;
   a sensor configured to sense the information embedded within the component;
   a module configured to, based on the sensor sensing the information embedded within the component, determine one or both of (i) a characteristic of the component and (ii) a configuration parameter of the apparatus; and
   a print mechanism disposed above the surface of the component, wherein the print mechanism is configured to, based on the determined one or both of (i) the characteristic of the component and (ii) the configuration parameter of the apparatus, fabricate the object on the surface of the component,
   wherein the component is a table insert that is removably attached to a table frame of the apparatus.

2. The apparatus of claim 1, wherein the sensor is attached to the table frame.

3. The apparatus of claim 1, wherein the module is configured to determine one or both of (i) the characteristic of the component and (ii) the configuration parameter of the apparatus by:
   accessing a server over a network; and
   based on the information sensed by the sensor, retrieving, from the server, one or both of (i) the characteristic of the component and (ii) the configuration parameter of the apparatus.

4. The apparatus of claim 1, wherein the characteristic of the component comprises information associated with one of a thickness of the component, a surface finish of the component, a surface evenness of the component, and a thermal property of the component.

5. The apparatus of claim 1, wherein the configuration parameter of the apparatus comprises one of a speed with which the print mechanism fabricates the object, a type and specification of glue to be disposed on the surface of the component while the object is being fabricated, a heating pattern for heating the component while the object is being fabricated, a cooling pattern for cooling the component while the object is being fabricated, a pressure with which printing material is to be deposited by the print mechanism while the object is being fabricated, and a setting of an extruder used for fabricating the object.

6. The apparatus of claim 1, wherein:
   the information is embedded within the component in a form of a bar code disposed on the surface of the component; and
   the sensor is configured to scan the bar code to sense the information represented by the bar code.

7. The apparatus of claim 1, further comprising:
   a near-field communication (NFC) tag embedded within or attached to the component,
   wherein the NFC tag stores the information, and
   wherein the sensor comprises a NFC tag reader configured to read the information stored in the NFC tag.

8. The apparatus of claim 1, further comprising:
   a radio frequency identifier (RFID) tag embedded within or attached to the component,
   wherein the RFID tag stores the information, and
   wherein the sensor comprises a RFID reader configured to read the information stored in the RFID tag.

9. The apparatus of claim 1, further comprising:
   a memory embedded within or attached to the component,
   wherein the memory stores the information, and
   wherein the sensor comprises a memory port and a circuit to read information stored in the memory.

10. A method for fabricating a three-dimensional object from a digital representation of the object stored in a computer readable media, the method comprising:
   sensing, by a sensor, information embedded within a component, wherein the component has a surface, and wherein the component is a table insert;

based on sensing the information embedded within the component, determining, by a module, one or both of (i) a characteristic of the component and (ii) a configuration parameter associated with fabricating the object;

based on determining one or both of (i) the characteristic of the component and (ii) the configuration parameter associated with fabricating the object, fabricating, by a print mechanism, the object on the surface of the component, and removably attaching the table insert to a table frame.

11. The method of claim 10, wherein determining one or both of (i) the characteristic of the component and (ii) the configuration parameter associated with fabricating the object comprises:

accessing a server over a network; and based on the information sensed by the sensor, retrieving, from the server, one or both of (i) the characteristic of the component and (ii) the configuration parameter of the apparatus.

12. The method of claim 10, wherein the characteristic of the component comprises information associated with one of a thickness of the component, a surface finish of the component, a surface evenness of the component, and a thermal property of the component.

13. The method of claim 10, wherein the configuration parameter associated with fabricating the object comprises one of a speed with which the print mechanism fabricates the object, a type and specification of glue to be disposed on the surface of the component while the object is being fabricated, a heating pattern for heating the component while the object is being fabricated, a cooling pattern for cooling the component while the object is being fabricated, a pressure with which printing material is to be deposited by the print mechanism while the object is being fabricated, and a setting of an extruder used for fabricating the object.

14. The method of claim 10, wherein the information is embedded within the component in a form of a bar code disposed on the surface of the component, wherein the sensor comprises a bar code reader, and wherein sensing the information embedded within the component comprises:

scanning the bar code to sense the information represented by the bar code.

15. The method of claim 10, wherein a near-field communication (NFC) tag, which is embedded within or attached to the component, stores the information, wherein the sensor comprises a NFC tag reader, and wherein sensing the information embedded within the component comprises:

reading, using the NFC reader, the information stored in the NFC tag.

16. The method of claim 10, wherein a radio frequency identifier (RFID) tag, which is embedded within or attached to the component, stores the information, wherein the sensor comprises a RFID tag reader, and wherein sensing the information embedded within the component comprises:

reading, using the RFID tag reader, the information stored in the RFID tag.

17. The method of claim 10, wherein a memory, which is embedded within or attached to the component, stores the information, wherein the sensor comprises a memory port and a circuit, and wherein sensing the information embedded within the component comprises:

reading, by the memory port and the circuit, the information stored in the memory.

* * * * *